US010181601B2

United States Patent
Tsuji et al.

(10) Patent No.: US 10,181,601 B2
(45) Date of Patent: Jan. 15, 2019

(54) LITHIUM MANGANESE PHOSPHATE NANOPARTICLES AND METHOD FOR MANUFACTURING SAME, CARBON-COATED LITHIUM MANGANESE PHOSPHATE NANOPARTICLES, CARBON-COATED LITHIUM MANGANESE PHOSPHATE NANOPARTICLE GRANULATED BODY, AND LITHIUM ION CELL

(71) Applicant: TORAY INDUSTRIES, INC., Tokyo (JP)

(72) Inventors: Hironobu Tsuji, Otsu (JP); Yasuo Kubota, Otsu (JP); Hiroaki Kawamura, Otsu (JP); Eiichiro Tamaki, Otsu (JP); Miyuki Tabayashi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/679,345

(22) Filed: Aug. 17, 2017

(65) Prior Publication Data

US 2017/0352879 A1    Dec. 7, 2017

Related U.S. Application Data

(63) Continuation of application No. PCT/JP2016/058975, filed on Mar. 22, 2016.

(30) Foreign Application Priority Data

Mar. 31, 2015    (JP) ................................ 2015-072332

(51) Int. Cl.
*H01M 4/36*    (2006.01)
*H01M 4/505*    (2010.01)
(Continued)

(52) U.S. Cl.
CPC ............. *H01M 4/366* (2013.01); *C01B 25/45* (2013.01); *H01M 4/133* (2013.01); *H01M 4/136* (2013.01);
(Continued)

(58) Field of Classification Search
CPC ..... H01M 4/366; H01M 4/505; H01M 4/5825
(Continued)

(56) References Cited

U.S. PATENT DOCUMENTS

2009/0186275 A1    7/2009  Exnar et al.
2015/0333319 A1    11/2015 Kawamura et al.

FOREIGN PATENT DOCUMENTS

WO    WO 2014/115670 A1    7/2014

OTHER PUBLICATIONS

Kang et al. Electrochemical Performance of LiMnPO4 Synthesized with Off-Stoichiometery. J. Electro. Soc., vol. 157, 2010, pp. A808-A811 [online], [retrieved on Aug. 29, 2018]. Retrieved from the Internet URL: <http://jes.ecsdl.org/content/157/7/A808.full.pdf+html> (Year: 2010).*

(Continued)

*Primary Examiner* — James M Erwin
(74) *Attorney, Agent, or Firm* — Birch, Stewart, Kolasch & Birch LLP

(57) ABSTRACT

The present invention makes a lithium ion secondary cell exhibit high capacity when lithium manganese phosphate is used as the active material of the lithium ion secondary cell. The present invention is directed to lithium manganese phosphate nanoparticles having a ratio $I_{20}/I_{29}$ of the peak intensity at 20° to the peak intensity at 29° obtained by X-ray diffraction of greater than or equal to 0.88 and less than or equal to 1.05, and a crystallite size determined by X-ray diffraction of greater than or equal to 10 nm and less than or equal to 50 nm.

10 Claims, 1 Drawing Sheet

(51) Int. Cl.
  *C01B 25/45*  (2006.01)
  *H01M 4/133*  (2010.01)
  *H01M 4/136*  (2010.01)
  *H01M 4/58*  (2010.01)
  *H01M 4/583*  (2010.01)
  *H01M 10/0525*  (2010.01)
  *H01M 4/587*  (2010.01)
  *H01M 4/62*  (2006.01)

(52) U.S. Cl.
  CPC ........... *H01M 4/505* (2013.01); *H01M 4/583* (2013.01); *H01M 4/587* (2013.01); *H01M 4/5825* (2013.01); *H01M 4/625* (2013.01); *H01M 10/0525* (2013.01); *C01P 2002/74* (2013.01); *C01P 2004/61* (2013.01); *C01P 2004/64* (2013.01); *C01P 2004/80* (2013.01); *C01P 2006/40* (2013.01); *Y02T 10/7011* (2013.01)

(58) Field of Classification Search
  USPC ...................................................... 429/231.1
  See application file for complete search history.

(56) References Cited

OTHER PUBLICATIONS

Extended European Search Report issued in 16772447.5 dated Oct. 30, 2018.

\* cited by examiner

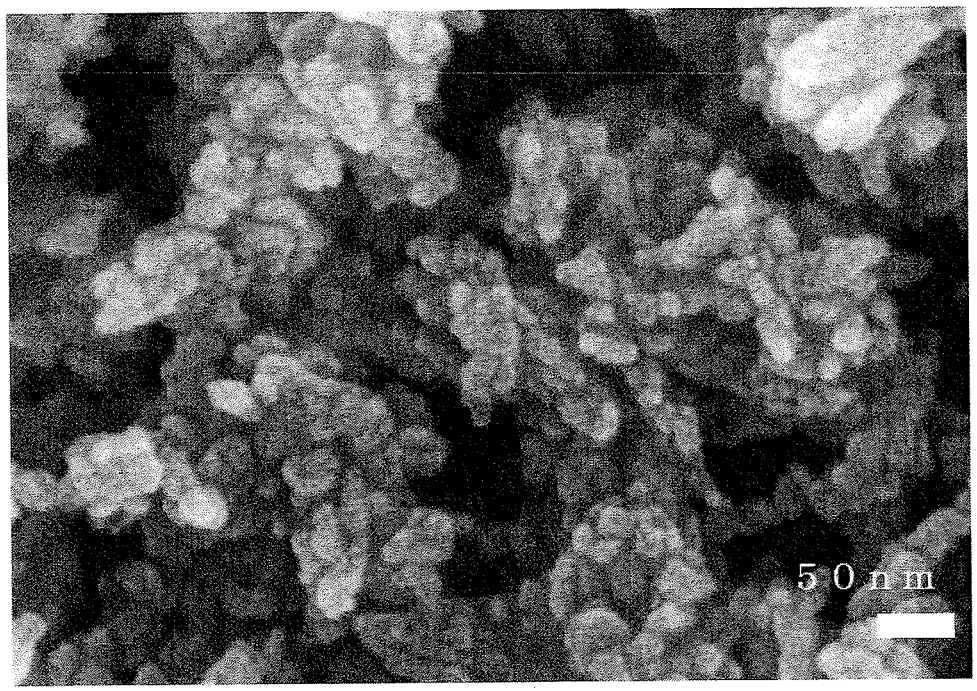

LITHIUM MANGANESE PHOSPHATE NANOPARTICLES AND METHOD FOR MANUFACTURING SAME, CARBON-COATED LITHIUM MANGANESE PHOSPHATE NANOPARTICLES, CARBON-COATED LITHIUM MANGANESE PHOSPHATE NANOPARTICLE GRANULATED BODY, AND LITHIUM ION CELL

TECHNICAL FIELD

The present invention relates to lithium manganese phosphate nanoparticles and a method for manufacturing the same, carbon-coated lithium manganese phosphate nanoparticles, a carbon-coated lithium manganese phosphate nanoparticle granulated body and a lithium ion cell.

BACKGROUND ART

A lithium ion secondary cell has been widely used, as a cell capable of attaining higher voltage/higher energy density than a conventional nickel-cadmium cell or nickel metal hydride cell does, for information-related mobile communication electronic equipment such as mobile phones and laptop personal computers. As a means for solving environmental problems, the application of the lithium ion secondary cell to an onboard use in which the cell is incorporated into an electric vehicle, a hybrid electric vehicle and the like or an industrial use such as an electric power tool is expected to increase in the future.

In the lithium ion secondary cell, a positive electrode active material and a negative electrode active material play an important role in deciding the capacity and output. In a conventional lithium ion secondary cell, lithium cobaltate ($LiCoO_2$) and carbon are often used as the positive electrode active material and the negative electrode active material, respectively. However, with the recent expansion of the application of a lithium ion cell to a hybrid vehicle or an electric vehicle, the cell has been increasingly required to attain not only the enhancement in capacity but also the enhancement in output which indicates the magnitude of the capacity taken out in a short time. In order to make a cell attain highly enhanced output, that is, to efficiently take out a large current from a cell, it is necessary to enhance the electron conductivity and also enhance the ion conductivity of lithium ions at the same time.

On the other hand, for the purpose of making a lithium ion secondary cell attain highly enhanced capacity and highly enhanced output, the search for a next-generation active material has also been actively conducted. In positive electrode active materials, olivine-based materials, that is, active materials such as lithium iron phosphate ($LiFePO_4$) and lithium manganese phosphate ($LiMnPO_4$) have been attracting attention as next-generation active materials. An effect of enhancing the capacity is restrictively exerted because the capacity of lithium iron phosphate or lithium manganese phosphate remains within about 1.2 times the capacity of lithium cobaltate, but lithium iron phosphate and lithium manganese phosphate have a great merit in terms of stable supply since cobalt, which is a rare metal, is not contained therein. Furthermore, in the olivine-based active material, oxygen is hardly emitted therefrom because the oxygen atom is covalently bonded with the phosphorus atom, and the olivine-based active material also has a feature of attaining a high level of safety. Of these, lithium manganese phosphate can be expected to also contribute to the enhancement in output because the discharge potential is high in the case of being used as the positive electrode active material of a lithium ion secondary cell. However, unlike lithium cobaltate ($LiCoO_2$) or the like, the olivine-based positive electrode active material has a problem that it is difficult to take out the capacity inherently possessed by the active material, that is, the theoretical capacity, because the change in the crystal lattice associated with the charge-discharge is significant, and the olivine-based positive electrode active material is low in electron conductivity and ion conductivity.

On that account, an olivine-based positive electrode material is micronized so as to have a crystallite size of about 200 nm, and furthermore, the particle surface is coated with carbon to achieve the reduction of the influence of a strain associated with the change in the crystal lattice size and the enhancement in ion conductivity and electron conductivity. Although the theoretical capacity is substantially exhibited by this method with regard to lithium iron phosphate, with regard to lithium manganese phosphate, it is difficult to attain highly enhanced capacity of a cell only by this method, and thus, there have been reported various attempts aimed at making lithium manganese phosphate exhibit its theoretical capacity.

It has been well known that the shape of a particle is of importance for making a cell prepared with lithium manganese phosphate attain highly enhanced capacity. Lithium manganese phosphate, which is extremely low in ion conductivity and electron conductivity, is required to have a smaller particle diameter than that of lithium iron phosphate. Lithium manganese phosphate is also required to have a shape with which the Li-ion conductivity is enhanced and the influence of a strain associated with the charge-discharge reaction is reduced.

In order to attain such a shape, there have been proposed plate-like particles oriented in the b-axis direction. This is an idea of making the moving distance of a lithium ion in the inside of a particle as short as possible and widening the area of an opening through which a lithium ion is extracted and inserted since the lithium ion can move only in the b-axis direction in lithium manganese phosphate. For example, by each of manufacturing methods disclosed in Patent Document 1 and Non-Patent Document 1, a kind of lithium manganese phosphate which is oriented along the b-axis in an aqueous diethylene glycol solution and has a thickness of about 20 to 30 nm is obtained. Moreover, Patent Document 2 also discloses an effect of lithium manganese phosphate oriented in the b-axis direction.

PRIOR ART DOCUMENTS

Patent Documents

Patent Document 1: Japanese Patent No. 5174803
Patent Document 2: Japanese Patent Laid-open Publication No. 2012-204015

Non-Patent Document

Non-Patent Document 1: Journal of Power Sources 189 (2009) 624-628

SUMMARY OF THE INVENTION

Problems to be Solved by the Invention

In each of methods of Patent Document 1 and Non-Patent Document 1, a kind of lithium manganese phosphate oriented in the b-axis direction is obtained, but the orientation property is not sufficiently maintained finally because the b-axis oriented lithium manganese phosphate particles obtained are previously crushed with a ball mill before being used as the active material. Moreover, since materials other than the active material, that is, additive agents such as a binder and a conductive additive, do not directly contribute to the capacity of a cell, the addition amount thereof to an electrode is required to be reduced as much as possible. However, in Non-Patent Document 1, since carbon black in a content of 20% by weight relative to lithium manganese phosphate is added at the time of cell formation, there is a problem that the capacity as the whole electrode is lowered.

Also in Patent Document 2, a kind of lithium manganese phosphate as plate-like particles oriented in the b-axis direction is manufactured, but the discharge capacity exhibited by the particles is one-half or less of the theoretical capacity. Accordingly, the crystal orientation property of particles disclosed in Patent Document 2 fails to sufficiently exert the performance of lithium manganese phosphate.

As described above, for making a cell prepared with lithium manganese phosphate attain highly enhanced capacity, the optimization of the shape of a particle of lithium manganese phosphate and the optimization of the crystallinity thereof are required. However, in the case where attention is focused only on the movement of the lithium ion and only particles oriented along the b-axis are manufactured, it has been difficult to make a cell exhibit inherent high capacity which lithium manganese phosphate has.

An object of the present invention is to elucidate the crystal orientation property in lithium manganese phosphate with which highly enhanced capacity can be attained and to provide an electrode prepared with lithium manganese phosphate, and furthermore, a lithium ion secondary cell prepared with the electrode.

Solutions to the Problems

For the purpose of making lithium manganese phosphate exhibit high capacity close to the theoretical capacity, the present inventors have conducted diligent studies on the orientation of primary particles indicated by the peak intensity ratio determined by powder X-ray diffraction.

The present invention for solving the above-mentioned problems is directed to lithium manganese phosphate nanoparticles having a ratio $I_{20}/I_{29}$ of the peak intensity at 20° to the peak intensity at 29° obtained by X-ray diffraction of greater than or equal to 0.88 and less than or equal to 1.05, and a crystallite size determined by X-ray diffraction of greater than or equal to 10 nm and less than or equal to 50 nm.

Effects of the Invention

According to the present invention, with regard to lithium manganese phosphate which is low in electron conductivity and ion conductivity, the highly enhanced capacity can be attained by controlling the crystallite size and the crystal orientation of primary particles. Moreover, by using a positive electrode active material of the present invention, there can be provided a lithium ion secondary cell having high capacity/high output.

BRIEF DESCRIPTION OF THE DRAWING

FIG. 1 shows a scanning electron microphotograph of lithium manganese phosphate nanoparticles obtained in Example 1.

EMBODIMENTS OF THE INVENTION

The lithium manganese phosphate in the present invention refers to an olivine crystal structure-containing compound represented by the chemical formula $LiMnPO_4$ and may contain negligible amounts of other elements as doping elements as long as the olivine crystal structure can be kept, and the respective composition ratios may be slightly increased or decreased. The doping element is added for the purpose of enhancing the electron conductivity and ion conductivity of lithium manganese phosphate, reducing a change in the crystal lattice size, and the like. As the doping element, Na, Mg, K, Ca, Sc, Ti, V, Cr, Fe, Co, Ni, Cu, Zn, Rb, Sr, Y, Zr, Nb, Mo, Tc, Ru, Rh, Pd, Ag, Cd, In, Sn, Cs, Ba and the like can be used. With regard to the content ratio of the doping element, in the case of doping elements other than Fe, at most 10% by mole thereof relative to the phosphorus element may be contained therein. Since Mn can be substituted with Fe in the olivine crystal structure to easily keep the olivine crystal structure, at most 30% by mole of Fe relative to the phosphorus element may be contained therein. As the doping element, Fe is preferred in the point that the electron conductivity and ion conductivity in the crystal can be enhanced. It is preferred that the doping amount of Fe be small because the voltage drops during discharging and the energy density is lowered when the doping amount of Fe is too large. The doping amount of Fe is preferably less than or equal to 20% by mole, more preferably less than or equal to 15% by mole, further preferably less than or equal to 10% by mole and most preferably less than or equal to 5%.

The lithium manganese phosphate nanoparticles according to the present invention refer to lithium manganese phosphate particles in which the average particle diameter of primary particles is less than or equal to 100 nm. In this context, the average particle diameter is defined as an average value of particle diameters of 100 particles, and the particle diameter of each particle is determined from an average value of diameters of an inscribed circle and a circumscribed circle determined from a two-dimensional image obtained when 10 to 20 particles are observed with a field emission-type scanning electron microscope so as to be put in a visual field.

The crystallite size obtained from the X-ray diffraction peak of the lithium manganese phosphate in the present invention is greater than or equal to 10 nm and less than or equal to 50 nm. Since the lithium manganese phosphate nanoparticle is generally obtained as a single crystal, the crystallite size corresponds directly to the particle diameter. As such, having a crystallite size of less than or equal to 50 nm means being micronized so as to have a particle diameter of less than or equal to about 50 nm. It is necessary for lithium manganese phosphate to be micronized to reduce the strain generated at the time of charge-discharge since the change in the crystal lattice size at the time of charge-discharge is large. For this purpose, it is necessary for the crystallite size thereof to be less than or equal to 50 nm. When the crystallite size exceeds 50 nm, an excessive voltage is required for desorption of lithium ions from lithium manganese phosphate at the time of charging. Moreover, having a crystallite size of less than 10 nm refers to being in a state of having substantially no crystallinity, and in such a lithium manganese phosphate nanoparticle, it is difficult for lithium to be extracted and inserted reversibly.

Moreover, the X-ray diffraction peak in the present invention can be measured by means of an X-ray diffractometer in which Cu is used as an X-ray source. The spectrum of an X-ray diffraction peak can be analyzed by a Rietveld analysis method to determine the crystallite size. In Rietveld analysis, it is necessary to verify the validity of the analysis, and in the case of using a GOF (Goodness-of-fit) value as an index, the value needs only to be less than or equal to 2.0. For example, D8ADVANCE available from Bruker Corporation can be used as the X-ray diffractometer, and TOPAS can be used as the analyzing software for Rietveld analysis.

The lithium manganese phosphate in the present invention has well-defined peaks at around 20°, 25°, 29° and 35° obtained by X-ray diffraction (hereinafter, simply referred to as a 20° peak, a 25° peak, a 29° peak and a 35° peak, respectively), and has a feature described below. In the case where a 20° peak, a 25° peak, a 29° peak and a 35° peak obtained by powder X-ray diffraction are indexed by (101), (201), (020) and (311) faces respectively, the intensity of each peak refers to the intensity of the orientation to each crystal face. In particular, a 29° peak is indexed by the (020) face, and the intensity thereof refers to the intensity of the orientation of particle growth in the b-axis direction. In the present specification, a value obtained by dividing the intensity of a 20° peak, a 25° peak or a 35° peak by the 29° peak intensity is expressed as $I_{20}/I_{29}$, $I_{25}/I_{29}$ or $I_{35}/I_{29}$, respectively.

The crystallinity of the lithium manganese phosphate in the present invention and the particle shape thereof are defined by the three peak intensity ratios $I_{20}/I_{29}$, $I_{25}/I_{29}$ and $I_{35}/I_{29}$ measured by X-ray diffraction. According to the investigation made by the present inventors, with regard to the crystallinity required for making lithium manganese phosphate exhibit highly enhanced capacity, it has become apparent that the orientation property in a specific direction of a crystal should preferably be lowered as much as possible to make the crystal homogeneously grow, instead of being oriented along the b-axis with attention being focused only on the conductivity of the lithium ion. Although making the crystal homogeneously grow makes the shape of a nanoparticle close to a spherical shape, it is thought that this has an effect of alleviating the strain at the particle surface caused by a change in the crystal lattice size at the time of a charge-discharge reaction because the surface area of the particle is reduced, and also has an effect of making the whole particle absorb the strain instead of distributing the strain in a specific direction. With regard to the lithium manganese phosphate nanoparticle hardly affected by the strain, it is thought that energy required for extracting/inserting lithium is reduced, and as a result, this contributes to the highly enhanced capacity.

With regard to the lithium manganese phosphate nanoparticles according to the present invention, the $I_{20}/I_{29}$ is greater than or equal to 0.88 and less than or equal to 1.05 and preferably greater than or equal to 0.90 and less than or equal to 1.05. The $I_{20}/I_{29}$ refers to the ratio of the (101) face to the b-axis face (020). The (020) face and the (101) face are in an orthogonal relationship, and making the value of $I_{20}/I_{29}$ greater than or equal to 0.88 and less than or equal to 1.05 means not orienting lithium manganese phosphate nanoparticles extremely in the b-axis direction and means making the shape of a particle close to a spherical shape instead of a plate-like shape. By making the shape of a particle close to a spherical shape, it becomes possible to alleviate the strain of the crystal lattice caused by extracting/inserting a lithium ion at the time of charge-discharge, and as a result, this can contribute to the enhancement in capacity.

With regard to the lithium manganese phosphate nanoparticles according to the present invention, it is preferred that the $I_{25}/I_{29}$ be greater than or equal to 0.95 and less than or equal to 1.15. The $I_{25}/I_{29}$ refers to the ratio of the (201) face to the b-axis face (020). The (020) face and the (201) face are in an orthogonal relationship. Making the $I_{20}/I_{29}$ greater than or equal to 0.88 and less than or equal to 1.05 and making the $I_{25}/I_{29}$ greater than or equal to 0.95 and less than or equal to 1.15 mean making particles have further lowered crystal orientation property, making the crystal have more homogeneous crystal orientation and further making the shape of a particle close to a spherical shape. As such, the effect of alleviating the strain of the crystal lattice caused by extracting/inserting a lithium ion at the time of charge-discharge is enhanced, and as a result, this can contribute to the enhancement in capacity.

With regard to the lithium manganese phosphate nanoparticles according to the present invention, it is preferred that the $I_{35}/I_{29}$ be greater than or equal to 1.05 and less than or equal to 1.20. The $I_{35}/I_{29}$ refers to the ratio of the (311) face to the b-axis face (020). Making the $I_{35}/I_{29}$ greater than or equal to 1.05 and less than or equal to 1.20 means making lithium manganese phosphate nanoparticles have further lowered crystal orientation property, making the crystal have more homogeneous crystal orientation and further making the shape of a particle close to a spherical shape. As such, the effect of alleviating the strain of the crystal lattice caused by extracting/inserting a lithium ion at the time of charge-discharge is enhanced, and as a result, this can contribute to the enhancement in capacity.

It is preferred that the lithium manganese phosphate nanoparticles according to the present invention have a degree of crystallinity of greater than or equal to 45%. The degree of crystallinity in the present invention refers to a proportion obtained by mixing lithium manganese phosphate with an equal weight of cerium oxide as the standard substance and subjecting the mixture to X-ray diffraction to be analyzed by a Rietveld analysis method. Having a degree of crystallinity of greater than or equal to 45% means making lithium manganese phosphate nanoparticles have sufficiently few amorphous parts, and the lithium manganese phosphate nanoparticles are preferred because a lithium ion can be extracted and inserted reversibly and this contributes to the enhancement in capacity. The degree of crystallinity in the present invention shall be measured in accordance with the following Example A.

The particle surface of the lithium manganese phosphate nanoparticles according to the present invention may be coated with carbon and subjected to conductive treatment, whereby carbon-coated lithium manganese phosphate nanoparticles can be obtained. In this case, it is preferred that the powder resistance value of the particles be greater than or equal to 1 Ω·cm and less than or equal to $10^8$ Ω·cm. When the value is greater than or equal to $10^8$ Ω·cm, at the time the particles are formed into an electrode, a capacity to be exhibited is significantly inhibited in some cases since the resistance of an electron moving from a current collector to the particle surface will be large.

In order to sufficiently educe the capacity of lithium manganese phosphate, it is preferred that carbon in an amount of greater than or equal to 1% by weight and less than 10% by weight relative to the lithium manganese phosphate nanoparticles be contained in such carbon-coated lithium manganese phosphate nanoparticles. By making the carbon-coated lithium manganese phosphate nanoparticles contain a suitable amount of carbon, at the time the particles are formed into an electrode, the electron conductivity in the electrode is enhanced and this contributes to making the lithium manganese phosphate nanoparticles exhibit their capacity. On the other hand, when a large amount of carbon is added thereto, since the conductivity of lithium ions is inhibited by the carbon and there is a tendency for the ion conductivity to be lowered, it is more preferred that the amount of carbon contained therein be less than 5% by weight.

In order to use the lithium manganese phosphate nanoparticles according to the present invention as a positive electrode active material for a lithium ion secondary cell, it is preferred that carbon-coated lithium manganese phosphate nanoparticles be aggregated to be formed into a secondary particle form, that is, formed into a carbon-coated-lithium manganese phosphate nanoparticle granulated body. It is preferred that the carbon-coated lithium manganese phosphate nanoparticle granulated body have a spherical shape. In this context, having a spherical shape means making a granulated body in a two-dimensional image obtained when 3 to 10 granulated bodies are observed with a field emission-type scanning electron microscope so as to be put in a visual field have a diameter ratio of the circumscribed circle of the granulated body to the inscribed circle thereof of greater than or equal to 0.7 and less than or equal to 1. In the present invention, when an average value of diameter ratios of the circumscribed circle of the granulated body to the inscribed circle thereof in the case where 100 carbon-coated lithium manganese phosphate nanoparticle granulated bodies are observed is greater than or equal to 0.7 and less than or equal to 1, the carbon-coated lithium manganese phosphate nanoparticle granulated body is judged to have a spherical shape. Moreover, in the present invention, it is preferred that 80 or more granulated bodies have a spherical shape when 100 carbon-coated lithium manganese phosphate nanoparticle granulated bodies are observed.

It is preferred that the average particle diameter of the carbon-coated lithium manganese phosphate nanoparticle granulated body be greater than or equal to 0.1 μm and less than or equal to 30 μm. When the average particle diameter is less than or equal to 0.1 μm, the solid content of the electrode paste is lowered and there is a tendency for the amount of a solvent required for coating to be increased. Moreover, in the case where the average particle diameter is greater than or equal to 30 μm, at the time of preparing an electrode, unevenness is formed on the electrode surface and there is a tendency for the cell reaction to hardly proceed uniformly in the electrode.

A method for manufacturing the lithium manganese phosphate nanoparticles according to the present invention is not particularly limited, and it is preferred that the kind of a solvent, the percentage occupied by moisture in the solvent, the stirring rate, the synthesis temperature and raw materials be appropriately controlled to manufacture the lithium manganese phosphate nanoparticles using a liquid phase synthesis technique. Hereinafter, a method for manufacturing the lithium manganese phosphate nanoparticles according to the present invention by a liquid phase synthesis technique will be described.

In the case of manufacturing the lithium manganese phosphate nanoparticles according to the present invention by a liquid phase synthesis technique, as a manganese raw material, manganese sulfate, manganese chloride, manganese nitrate, manganese formate, manganese acetate and a hydrate thereof can be used. Moreover, as a phosphoric acid raw material, phosphoric acid, ammonium dihydrogen phosphate, diammonium hydrogenphosphate, lithium dihydrogen phosphate, dilithium hydrogenphosphate, trilithium phosphate and a hydrate thereof can be used. Moreover, as a lithium raw material, lithium hydroxide, lithium carbonate, lithium chloride, lithium dihydrogen phosphate, dilithium hydrogenphosphate, trilithium phosphate and a hydrate thereof can be used. By using manganese sulfate, phosphoric acid and lithium hydroxide in a proportion of 1:1:3 in terms of the mole ratio, the lithium manganese phosphate nanoparticles according to the present invention can be suitably manufactured without producing by-products.

With regard to the kind of a solvent used in liquid phase synthesis, from the points of enabling the growth of the particle to be controlled and enabling the orientation of the crystal to be controlled, organic solvents having a coordinating property are preferred. Of the coordinating solvents, preferred examples of the solvent include an alcoholic solvent. Specific examples of the alcoholic solvent include ethylene glycol, diethylene glycol, triethylene glycol, tetraethylene glycol, 2-propanol, 1,3-propanediol and 1,4-butanediol. Other than these, polar solvents such as N-methylpyrrolidone, dimethyl sulfoxide, tetrahydrofuran, acetonitrile, N,N-dimethylformamide and acetic acid can be used. As the solvent, a plurality of kinds of solvents may be mixed to be used. In order to control the orientation property of the crystal of lithium manganese phosphate and manufacture the lithium manganese phosphate nanoparticles according to the present invention, since the solvent is required to have a strong coordinating property with lithium manganese phosphate, of the above-described solvents, diethylene glycol, triethylene glycol and tetraethylene glycol, which are especially strong in coordinating property, are preferred, and of these, diethylene glycol is preferred.

It is preferred that an organic solvent be used as the solvent for liquid phase synthesis. In order to make the lithium raw material, the manganese raw material and the phosphoric acid raw material uniformly dissolve and to control the coordinating property with lithium manganese phosphate nanoparticles, it is further preferred that the solvent be a mixture of an organic solvent and water. It is preferred that the proportion occupied by water in the whole solvent at the completion of the synthesis be greater than or equal to 15% by weight and less than or equal to 50% by weight. When the proportion of water is less than or equal to 15% by weight, it is difficult to dissolve all of raw materials, and when the proportion of water is greater than or equal to 50% by weight, the coordinating effect of the organic solvent is decreased and it is difficult to make lithium manganese phosphate into nanoparticles with a crystallite size of less than or equal to 50 nm.

The lithium manganese phosphate nanoparticles according to the present invention can be obtained by adding a solution of a manganese raw material and a phosphoric acid raw material to a lithium raw material solution stirred at a high speed to give a raw material mixture, and then heating the raw material mixture to a synthesis temperature with stirring at normal pressure or under a pressure of less than or equal to 0.13 MPa close to normal pressure. By adding phosphoric acid and manganese sulfate to a lithium raw material solution stirred at a high speed, a dispersion of a fine particulate precursor weakly oriented in a specific crystal orientation direction can be obtained. Then, by heating the dispersion, lithium manganese phosphate particles of a nano size can be finally obtained. Being stirred at a high speed in the present invention refers to being stirred at a peripheral speed of greater than or equal to 1 m/second.

For example, in the case where the lithium manganese phosphate nanoparticles according to the present invention is manufactured by a liquid phase synthesis technique in which manganese sulfate, phosphoric acid and lithium hydroxide are used as raw materials and the raw material ratio is set to Mn:P:Li=1:1:3 in terms of the mole ratio, it is preferred that lithium hydroxide be dissolved in an aqueous diethylene glycol solution, then, an aqueous solution in which phosphoric acid and manganese sulfate are dissolved be added to the aqueous diethylene glycol solution in a state of being stirred at a high speed at ordinary temperature of about 25° C. to prepare a precursor solution, and then, the precursor solution be heated to a synthesis temperature.

It is preferred that the synthesis temperature be higher than or equal to 100° C. and lower than or equal to 150° C. For making the chemical reaction in which the raw material is converted into lithium manganese phosphate proceed, it is necessary that a certain amount of thermal energy be supplied. The formation of lithium manganese phosphate nanoparticles is promoted at a high temperature of higher than or equal to 100° C. Moreover, the size of a particle formed greatly depends on the synthesis temperature. When the particles are synthesized at a temperature of higher than 150° C., the particles are liable to grow into coarse particles and it is difficult to obtain nanoparticles with a crystallite size of less than or equal to 50 nm.

Moreover, it is necessary that the liquid phase synthesis be performed under a pressure of less than or equal to 0.13 MPa close to normal pressure. It is preferred that the pressure be less than or equal to 0.12 MPa in order to weaken the orientation property in crystal growth, the pressure is more preferably less than or equal to 0.11 MPa, and further preferably, the liquid phase synthesis is performed at normal pressure. In general, there are cases where particles with high crystallinity are obtained when synthesized under a positive pressure using an autoclave or the like, and there is a tendency for the crystal orientation in a specific direction to be strengthened when the particles are synthesized under a positive pressure.

For making the lithium manganese phosphate nanoparticles according to the present invention into carbon-coated lithium manganese phosphate nanoparticles, a method of mixing lithium manganese phosphate nanoparticles with a kind of saccharide such as glucose and firing the mixture at about 700° C. under an inert atmosphere to form a carbon layer on the particle surface is preferred. It is suitable that the amount of carbon contained in the carbon-coated lithium manganese phosphate nanoparticle be controlled by the amount of a kind of saccharide to be mixed.

For making the carbon-coated lithium manganese phosphate nanoparticles according to the present invention into a carbon-coated lithium manganese phosphate nanoparticle granulated body, it is preferred that the particles be subjected to spray drying in the course of carbon coating to be granulated. Specifically, it is preferred that lithium manganese phosphate nanoparticles, a kind of saccharide and water be mixed to prepare a dispersion and the dispersion be subjected to drying/granulation by spray drying, and then, fired at about 700° C. under an inert atmosphere.

The lithium ion cell according to the present invention includes, as a positive electrode material, lithium manganese phosphate nanoparticles according to the present invention, carbon-coated lithium manganese phosphate nanoparticles according the present invention or a carbon-coated lithium manganese phosphate nanoparticle granulated body according the present invention.

EXAMPLES

Hereinafter, the present invention will be described in more detail by reference to examples, but the present invention is not limited only to these examples. Moreover, physical property values in examples were measured by the following methods. "Part" in examples means "part by weight" unless otherwise stated.

A. Calculation of Crystallite Size and Peak Intensity Ratios

With regard to the crystallite size and powder X-ray diffraction patterns of samples, using the D8 ADVANCE available from Bruker ASX K.K., the measurement was performed. Measurement conditions of 2θ=5° to 70°, a scan interval of 0.02° and a scan speed of 20 seconds/deg were adopted to perform the measurement. A sample was analyzed for the calculation of the crystallite size by a Rietveld analysis method using the analyzing software for powder X-ray diffraction TOPAS available from Bruker ASX K.K. Using the analyzing software for powder X-ray diffraction EVA available from Bruker ASX K.K., the background removal (coefficient 1.77) was performed and peak intensities were read to calculate the peak intensity ratios. Values obtained by dividing each of intensities of 20° peak, 25° peak and 35° peak by the intensity of 29° peak were defined as $I_{20}/I_{29}$, $I_{25}/I_{29}$ and $I_{35}/I_{29}$, respectively.

B. Measurement of Degree of Crystallinity

Using the D8 ADVANCE available from Bruker ASX K.K., the measurement of the degree of crystallinity was performed by powder X-ray diffraction. With a balance, 50-mg portions of lithium manganese phosphate particles and cerium oxide (Sigma-Aldrich Co. LLC.) were weighed respectively and mixed in a mortar to prepare a sample, and the sample was subjected to powder X-ray diffraction. Using the analyzing software for powder X-ray diffraction TOPAS available from Bruker ASX K.K., the sample was analyzed by a Rietveld analysis method to calculate the proportion of lithium manganese phosphate to cerium oxide, and the proportion of lithium manganese phosphate was defined as the degree of crystallinity.

C. Measurement of Resistivity

Using the Loresta (registered trademark) GP available from Mitsubishi Chemical Analytech Co., Ltd., the resistivity was measured. In a press jig with a diameter of φ 13 mm, 100 mg of lithium manganese phosphate particles were placed and a pressure of 8 tons was applied thereto by means of a press machine to form the particles into a pellet, after which the pellet was measured for the resistivity.

D. Measurement of Proportion of Carbon

Lithium manganese phosphate nanoparticles were measured for the weight proportion of carbon contained therein by means of the carbon/sulfur combustion analyzer EMIA-810W available from HORIBA, Ltd.

E. Measurement of Particle Size Distribution

Using a laser diffraction/scattering type particle size distribution measuring apparatus LA-920 available from HORIBA, Ltd., lithium manganese phosphate nanoparticles after granulated were measured for the average secondary particle diameter.

F. Measurement of Charge and Discharge Characteristics

An electrode was prepared with the obtained lithium manganese phosphate particles in the following manner. With a planetary mixer, 900 parts by weight of lithium manganese phosphate nanoparticles, 50 parts by weight of acetylene black (DENKA BLACK (registered trademark) available from Denka Company Limited) as a conductive additive, 50 parts by weight of polyvinylidene fluoride (Arkema K.K. Kynar HSV900) as a binder and 1200 parts by weight of N-methylpyrrolidone as a solvent were mixed to obtain an electrode paste. The electrode paste was applied to a sheet of aluminum foil (18 μm in thickness) using a doctor blade (300 μm) and was dried for 30 minutes at 80° C. to obtain an electrode plate. The prepared electrode plate was cut out into a piece with a diameter of 15.9 mm as a positive electrode, a sheet of lithium foil cut out into a piece with a diameter of 16.1 mm and a thickness of 0.2 mm was used as a negative electrode, a sheet of Celgard (registered trademark) #2400 (available from Celgard K.K.) cut out into a piece with a diameter of 20 mm was used as a separator, a solvent of ethylene carbonate containing $LiPF_6$ in a concentration of 1 M:diethyl carbonate=3:7 (volume ratio) was used as an electrolytic solution, and a 2032 type coin battery was prepared to perform the electrochemical evaluation. In the measurement, the theoretical capacity was set to 171 mAh/g, charge and discharge measurement was performed at a rate of 0.1 C three times, and subsequently, performed at a rate of 3 C three times, and the capacity at the time of third discharge at each rate was defined as the discharge capacity.

Example 1

In 16 g of pure water, 60 mmol of lithium hydroxide monohydrate was dissolved, after which 104 g of diethylene glycol was added thereto to prepare an aqueous lithium hydroxide/diethylene glycol solution. To the obtained aqueous lithium hydroxide/diethylene glycol solution stirred at 2000 rpm with a homo disper (HOMOGENIZING DISPER Model 2.5 available from PRIMIX Corporation), an aqueous solution prepared by dissolving 20 mmol of phosphoric acid (an aqueous 85% solution) and 20 mmol of manganese sulfate monohydrate in 10 g of pure water was added to obtain a lithium manganese phosphate nanoparticle precursor. The obtained precursor solution was heated to 110° C. and held at the temperature for 2 hours to obtain lithium manganese phosphate nanoparticles as a solid matter. To the obtained nanoparticles was added pure water, and solvent removal with a centrifugal separator was repeated to wash the nanoparticles. As shown in FIG. 1, the obtained lithium manganese phosphate nanoparticles were determined to have a shape similar to that of a solid of revolution of the ellipse. The synthesis was repeated until the weight of lithium manganese phosphate particles obtained after being washed became 10 g.

To 10 g of the obtained lithium manganese phosphate nanoparticles, 2.5 g of glucose and 40 g of pure water were added and mixed therewith, and using a spray drying apparatus (ADL-311-A available from Yamato Scientific Co., Ltd.), the nanoparticles were granulated under the conditions of a nozzle diameter of 400 μm, a drying temperature of 150° C. and an atomizing pressure of 0.2 MPa. The granulated particles obtained were subjected to firing in a firing furnace for 1 hour at 700° C. under a nitrogen atmosphere to obtain a carbon-coated lithium manganese phosphate nanoparticle granulated body.

According to A. above, the measurement for powder X-ray diffraction was performed. The peak intensity ratios of $I_{20}/I_{29}=1.01$, $I_{25}/I_{29}=1.07$ and $I_{35}/I_{29}=1.14$ were attained, and the crystallite size was determined to be 41.2 nm.

According to B. above, the degree of crystallinity was determined. The degree was determined to be 49%.

According to C. above, the resistivity was measured. The resistivity was determined to be 89 kΩ·cm.

According to D. above, the proportion of carbon was measured. The proportion was determined to be 3.5 wt %.

According to E. above, the particle size distribution was measured. The average particle diameter was determined to be 9.2 μm.

According to F. above, the discharge capacity was measured under the conditions of an upper limit voltage of 4.4 V and a lower limit voltage of 3.0 V. The discharge capacities were determined to be 142 mAh/g at a rate of 0.1 C and 109 mAh/g at a rate of 3 C.

The results are shown in Table 1. In the table, DEG, TriEG and TEG refer to diethylene glycol, triethylene glycol and tetraethylene glycol, respectively.

Example 2

A carbon-coated lithium manganese phosphate nanoparticle granulated body was obtained in the same manner as that in Example 1 except that the synthesis temperature was set to 125° C. The results obtained by evaluating the resultant carbon-coated lithium manganese phosphate nanoparticle granulated body in the same manner as that in Example 1 are shown in Table 1.

Example 3

A carbon-coated lithium manganese phosphate nanoparticle granulated body was obtained in the same manner as that in Example 1 except that the synthesis temperature was set to 140° C. The results obtained by evaluating the resultant carbon-coated lithium manganese phosphate nanoparticle granulated body in the same manner as that in Example 1 are shown in Table 1.

Example 4

A carbon-coated lithium manganese phosphate nanoparticle granulated body was obtained in the same manner as that in Example 1 except that the rotation number of the homo disper was set to 3000 rpm. The results obtained by evaluating the resultant carbon-coated, lithium manganese phosphate nanoparticle granulated body in the same manner as that in Example 1 are shown in Table 1.

Example 5

A carbon-coated lithium manganese phosphate nanoparticle granulated body was obtained in the same manner as that in Example 1 except that the rotation number of the homo disper was set to 4000 rpm. The results obtained by evaluating the resultant carbon-coated lithium manganese phosphate nanoparticle granulated body in the same manner as that in Example 1 are shown in Table 1.

Example 6

A carbon-coated lithium manganese phosphate nanoparticle granulated body was obtained in the same manner as that in Example 1 except that the solvent used in the synthesis was changed from diethylene glycol to triethylene glycol. The results obtained by evaluating the resultant carbon-coated lithium manganese phosphate nanoparticle granulated body in the same manner as that in Example 1 are shown in Table 1.

Example 7

A carbon-coated lithium manganese phosphate nanoparticle granulated body was obtained in the same manner as that in Example 1 except that the solvent used in the synthesis was changed from 104 g of diethylene glycol to 48 g of tetraethylene glycol. The results obtained by evaluating the resultant carbon-coated lithium manganese phosphate nanoparticle granulated body in the same manner as that in Example 1 are shown in Table 1.

Example 8

A carbon-coated lithium manganese phosphate nanoparticle granulated body was obtained in the same manner as that in Example 1 except that the solvent used in the synthesis was changed from 104 g of diethylene glycol to 104 g of tetraethylene glycol. The results obtained by evaluating the resultant lithium manganese phosphate nanoparticles in the same manner as that in Example 1 are shown in Table 1.

Example 9

In the same manner as that in Example 1, 10 g of lithium manganese phosphate nanoparticles were synthesized except that the synthesis temperature was set to 160° C. Then, the obtained particles were crushed with a planetary ball mill, after which to the crushed particles were added 2.5 g of glucose and 40 g of pure water as in the case of Example 1, and the mixture was spray-dried and then fired. In the planetary ball mill treatment, the P5 available from Fritsch Japan Co., Ltd. was used as the apparatus body, a zirconia-made 45-ml vessel was used as the vessel, eighteen zirconia-made 10-mm beads were used as the beads, and the treatment was performed under the conditions of a rotation number of 300 rpm and a treatment time of 6 hours. The results obtained by evaluating the resultant carbon-coated lithium manganese phosphate nanoparticle granulated body in the same manner as that in Example 1 are shown in Table 1.

Example 10

A carbon-coated lithium manganese phosphate nanoparticle granulated body was obtained in the same manner as that in Example 1 except that 16 mmol of manganese sulfate monohydrate and 4 mmol of ferrous sulfate heptahydrate were dissolved. The results obtained by evaluating the resultant lithium manganese phosphate nanoparticle granulated body in the same manner as that in Example 1 are shown in Table 1.

Example 11

A carbon-coated lithium manganese phosphate nanoparticle granulated body was obtained in the same manner as that in Example 1 except that 17 mmol of manganese sulfate monohydrate and 3 mmol of ferrous sulfate heptahydrate were dissolved. The results obtained by evaluating the resultant lithium manganese phosphate nanoparticle granulated body in the same manner as that in Example 1 are shown in Table 1.

Comparative Example 1

A carbon-coated lithium manganese phosphate nanoparticle granulated body was obtained in the same manner as that in Example 1 except that the rotation number of the homo disper was set to 500 rpm. The results obtained by evaluating the resultant carbon-coated lithium manganese phosphate nanoparticle granulated body in the same manner as that in Example 1 are shown in Table 2.

Comparative Example 2

A carbon-coated lithium manganese phosphate nanoparticle granulated body was obtained in the same manner as that in Example 1 except that the amount of pure water in which lithium hydroxide was dissolved was changed from 16 g to 117 g. The results obtained by evaluating the resultant carbon-coated lithium manganese phosphate nanoparticle granulated body in the same manner as that in Example 1 are shown in Table 2.

Comparative Example 3

A carbon-coated lithium manganese phosphate nanoparticle granulated body was obtained in the same manner as that in Example 1 except that the precursor solution of lithium manganese phosphate nanoparticles was placed in a pressure-resistant sealed vessel, heated to 110° C. and held at the temperature for 4 hours instead of being heated to 110° C. at normal pressure and held at the temperature for 2 hours. The results obtained by evaluating the resultant carbon-coated lithium manganese phosphate nanoparticle granulated body in the same manner as that in Example 1 are shown in Table 2.

Comparative Example 4

A carbon-coated lithium manganese phosphate nanoparticle granulated body was obtained in the same manner as that in Example 1 except that an aqueous lithium hydroxide/diethylene glycol solution was heated to 110° C., an aqueous solution prepared by dissolving 20 mmol of phosphoric acid (an aqueous 85% solution) and 20 mmol of manganese sulfate tetrahydrate in 10 g of pure water was added, and the solution was held at the temperature for 2 hours. The results obtained by evaluating the resultant carbon-coated lithium manganese phosphate nanoparticle granulated body in the same manner as that in Example 1 are shown in Table 2.

Comparative Example 5

A carbon-coated lithium manganese phosphate nanoparticle granulated body was obtained in the same manner as that in Example 9 except that crushing with a planetary ball mill was not performed. The results obtained by evaluating the resultant carbon-coated lithium manganese phosphate nanoparticle granulated body in the same manner as that in Example 1 are shown in Table 2.

Comparative Example 6

In 4.4 g of water, 20 mmol of manganese acetate tetrahydrate was dissolved and 60 g of diethylene glycol was added thereto, after which the contents were held at 110° C. for 1 hour to obtain a brown suspension. While the temperature of the obtained manganese acetate suspension was maintained at 110° C., an aqueous solution prepared by dissolving 20 mmol of lithium dihydrogen phosphate in 9.17 g of water was added dropwise to the manganese solution, and the contents were held at the temperature for 4 hours to obtain lithium manganese phosphate nanoparticles as a solid matter. The obtained nanoparticles were washed in the same manner as that in Example 1, and then, subjected to granulation by spray drying and a carbon-coating treatment with glucose. The results obtained by evaluating the resultant carbon-coated lithium manganese phosphate nanoparticle granulated body in the same manner as that in Example 1 are shown in Table 2.

Comparative Example 7

In 190 g of pure water, 40 mmol of trilithium phosphate and 40 mmol of manganese sulfate monohydrate were dissolved, and held at 130° C. for 1 hour using a pressure-resistant vessel to obtain lithium manganese phosphate nanoparticles as a solid matter. The obtained nanoparticles were subjected to washing, granulation and a carbon-coating treatment which are similar to those in Example 1. The results obtained by evaluating the resultant carbon-coated lithium manganese phosphate nanoparticle granulated body in the same manner as that in Example 1 are shown in Table 2.

TABLE 1

|  | Rotation number rpm | Solvent | Percentage of water in solvent (%) | Synthesis temperature (° C.) | Mn/Fe ratio | $I_{20}/I_{29}$ | $I_{25}/I_{29}$ | $I_{35}/I_{29}$ |
| --- | --- | --- | --- | --- | --- | --- | --- | --- |
| Example 1 | 2000 | DEG + water | 20 | 110 | 100/0 | 1.01 | 1.07 | 1.14 |
| Example 2 | 2000 | DEG + water | 20 | 125 | 100/0 | 1.02 | 1.11 | 1.12 |
| Example 3 | 2000 | DEG + water | 20 | 140 | 100/0 | 0.99 | 1.09 | 1.18 |
| Example 4 | 3000 | DEG + water | 20 | 110 | 100/0 | 0.94 | 0.97 | 1.11 |
| Example 5 | 4000 | DEG + water | 20 | 110 | 100/0 | 0.91 | 0.96 | 1.11 |
| Example 6 | 2000 | TriEG + water | 20 | 110 | 100/0 | 0.92 | 0.94 | 1.06 |
| Example 7 | 2000 | TEG + water | 35 | 110 | 100/0 | 0.92 | 0.95 | 1.03 |
| Example 8 | 2000 | TEG + water | 20 | 110 | 100/0 | 0.90 | 0.91 | 0.99 |
| Example 9 | 2000 | DEG + water | 20 | 160 | 100/0 | 1.00 | 1.05 | 1.15 |
| Example 10 | 2000 | DEG + water | 20 | 110 | 80/20 | 0.91 | 1.01 | 1.09 |
| Example 11 | 2000 | DEG + water | 20 | 110 | 85/15 | 0.91 | 1.01 | 1.12 |

|  | Crystallite size (nm) | Degree of crystallinity (%) | Resistivity (kΩ•cm) | Proportion of carbon (wt %) | Average particle diameter after granulated (μm) | 0.1 C Discharge capacity (mAh/g) | 3 C Discharge capacity (mAh/g) |
| --- | --- | --- | --- | --- | --- | --- | --- |
| Example 1 | 41.2 | 49 | 89 | 3.5 | 9.2 | 142 | 109 |
| Example 2 | 44.5 | 51 | 30 | 3.8 | 10.3 | 143 | 100 |
| Example 3 | 49.0 | 55 | 15 | 4.5 | 11.1 | 142 | 91 |
| Example 4 | 38.5 | 49 | 102 | 3.3 | 9.2 | 135 | 102 |
| Example 5 | 37.4 | 49 | 212 | 3.1 | 9.3 | 136 | 111 |
| Example 6 | 35.4 | 54 | 29 | 2.7 | 8.5 | 127 | 101 |
| Example 7 | 40.1 | 53 | 54 | 3.8 | 12.2 | 122 | 89 |
| Example 8 | 39.3 | 53 | 57 | 3.4 | 11.5 | 115 | 85 |
| Example 9 | 22.3 | 31 | 252 | 2.7 | 4.3 | 97 | 60 |
| Example 10 | 40.6 | 52 | 9 | 3.9 | 11.1 | 149 | 139 |
| Example 11 | 37.9 | 51 | 13 | 4.1 | 10.5 | 147 | 133 |

TABLE 2

|  | Rotation number rpm | Solvent | Percentage of water in solvent (%) | Synthesis temperature (° C.) | Mn/Fe ratio | $I_{20}/I_{29}$ | $I_{25}/I_{29}$ | $I_{35}/I_{29}$ |
| --- | --- | --- | --- | --- | --- | --- | --- | --- |
| Comparative Example 1 | 500 | DEG + water | 20 | 110 | 100/0 | 0.79 | 0.96 | 1.08 |
| Comparative Example 2 | 2000 | DEG + water | 55 | 110 | 100/0 | 0.87 | 0.93 | 0.99 |
| Comparative Example 3 | 2000 | DEG + water | 20 | 110 | 100/0 | 0.72 | 0.82 | 0.91 |
| Comparative Example 4 | 2000 | DEG + water | 20 | 110 | 100/0 | 0.80 | 0.90 | 0.98 |
| Comparative Example 5 | 2000 | DEG + water | 20 | 160 | 100/0 | 1.00 | 1.07 | 1.19 |
| Comparative Example 6 | 500 | DEG | 18 | 110 | 100/0 | 0.68 | 0.88 | 0.78 |
| Comparative Example 7 | 0 | water | 100 | 130 | 100/0 | 0.63 | 0.85 | 0.93 |

|  | Crystallite size (nm) | Degree of crystallinity (%) | Resistivity (kΩ•cm) | Proportion of carbon (wt %) | Average particle diameter after granulated (μm) | 0.1 C Discharge capacity (mAh/g) | 3 C Discharge capacity (mAh/g) |
| --- | --- | --- | --- | --- | --- | --- | --- |
| Comparative Example 1 | 40.4 | 50 | 77 | 3.6 | 10.1 | 68 | 43 |
| Comparative Example 2 | 56.7 | 52 | 45 | 4.5 | 8 | 65 | 39 |

TABLE 2-continued

| | | | | | | | |
|---|---|---|---|---|---|---|---|
| Comparative Example 3 | 36.0 | 53 | 113 | 3.1 | 13.1 | 54 | 10 |
| Comparative Example 4 | 33.5 | 52 | 61 | 3.4 | 10.1 | 44 | 10 |
| Comparative Example 5 | 55.4 | 57 | 18 | 5.5 | 16.5 | 70 | 38 |
| Comparative Example 6 | 22.2 | 49 | 56 | 3.2 | 11.2 | 69 | 33 |
| Comparative Example 7 | 31.2 | 56 | 77 | 3.9 | 10.9 | 76 | 55 |

The invention claimed is:

1. Lithium manganese phosphate nanoparticles, having a ratio $I_{20}/I_{29}$, the peak intensity at 20° to the peak intensity at 29° obtained by X-ray diffraction, of greater than or equal to 0.88 and less than or equal to 1.05, and a crystallite size determined by X-ray diffraction of greater than or equal to 10 nm and less than or equal to 50 nm.

2. The lithium manganese phosphate nanoparticles according to claim 1, wherein the $I_{20}/I_{29}$ is greater than or equal to 0.90 and less than or equal to 1.05.

3. The lithium manganese phosphate nanoparticles according to claim 1, further having a ratio $I_{25}/I_{29}$, the peak intensity at 25° to the peak intensity at 29° obtained by X-ray diffraction, of greater than or equal to 0.95 and less than or equal to 1.15.

4. The lithium manganese phosphate nanoparticles according to claim 1, further having a ratio $I_{35}/I_{29}$, the peak intensity at 35° to the peak intensity at 29° obtained by X-ray diffraction, of greater than or equal to 1.05 and less than or equal to 1.20.

5. The lithium manganese phosphate nanoparticles according to claim 1, further having a degree of crystallinity of greater than or equal to 45%.

6. Carbon-coated lithium manganese phosphate nanoparticles, comprising the lithium manganese phosphate nanoparticles according to claim 1 and a carbon coating on the lithium manganese phosphate nanoparticles.

7. The carbon-coated lithium manganese phosphate nanoparticles according to claim 6, comprising carbon in a proportion of greater than or equal to 1% by weight and less than 10% by weight relative to the lithium manganese phosphate nanoparticles.

8. A carbon-coated lithium manganese phosphate nanoparticle granulated body, comprising the carbon-coated lithium manganese phosphate nanoparticles according to claim 6 granulated so as to have an average particle diameter of greater than or equal to 0.1 μm and less than or equal to 30 μm.

9. A method for manufacturing lithium manganese phosphate nanoparticles, comprising the steps of:
adding a solution of a manganese raw material and a phosphoric acid raw material to a lithium raw material solution being stirred at a high speed to give a raw material mixture, and then
heating the raw material mixture to a synthesis temperature under a pressure of less than or equal to 0.13 MPa.

10. A lithium ion cell, comprising, as a positive electrode material, the lithium manganese phosphate particles according to claim 1.

* * * * *